United States Patent [19]

Kundert

[11] E Re. 28,491

[45] Reissued July 29, 1975

[54] ROOF DRAINING SYSTEM

[75] Inventor: Robert L. Kundert, Madison, Wis.

[73] Assignee: Drain-Away, Inc., Madison, Wis.

[22] Filed: July 3, 1974

[21] Appl. No.: 485,715

Related U.S. Patent Documents

Reissue of:

[64] Patent No.: 3,692,040
Issued: Sept. 19, 1972
Appl. No.: 105,322
Filed: Jan. 11, 1971

[52] U.S. Cl. ..... 137/142
[51] Int. Cl. ..... F16l 43/00
[58] Field of Search ..... 137/142, 147, 151, 135; 220/85

[56] References Cited

FOREIGN PATENTS OR APPLICATIONS 333,694 3/1921 Germany ..... 137/147

*Primary Examiner*—Henry T. Klinksiek
*Attorney, Agent, or Firm*—Andrus, Sceales, Starke & Sawall

[57] ABSTRACT

A roof draining system that automatically syphons water from roofs that are not completely self-draining. The system has a plurality of sumps and extending from each of said sumps are syphon pipes which connect to a common discharge pipe. The common discharge pipe is automatically primed by a control means when water has accumulated in the control sump.

8 Claims, 1 Drawing Figure

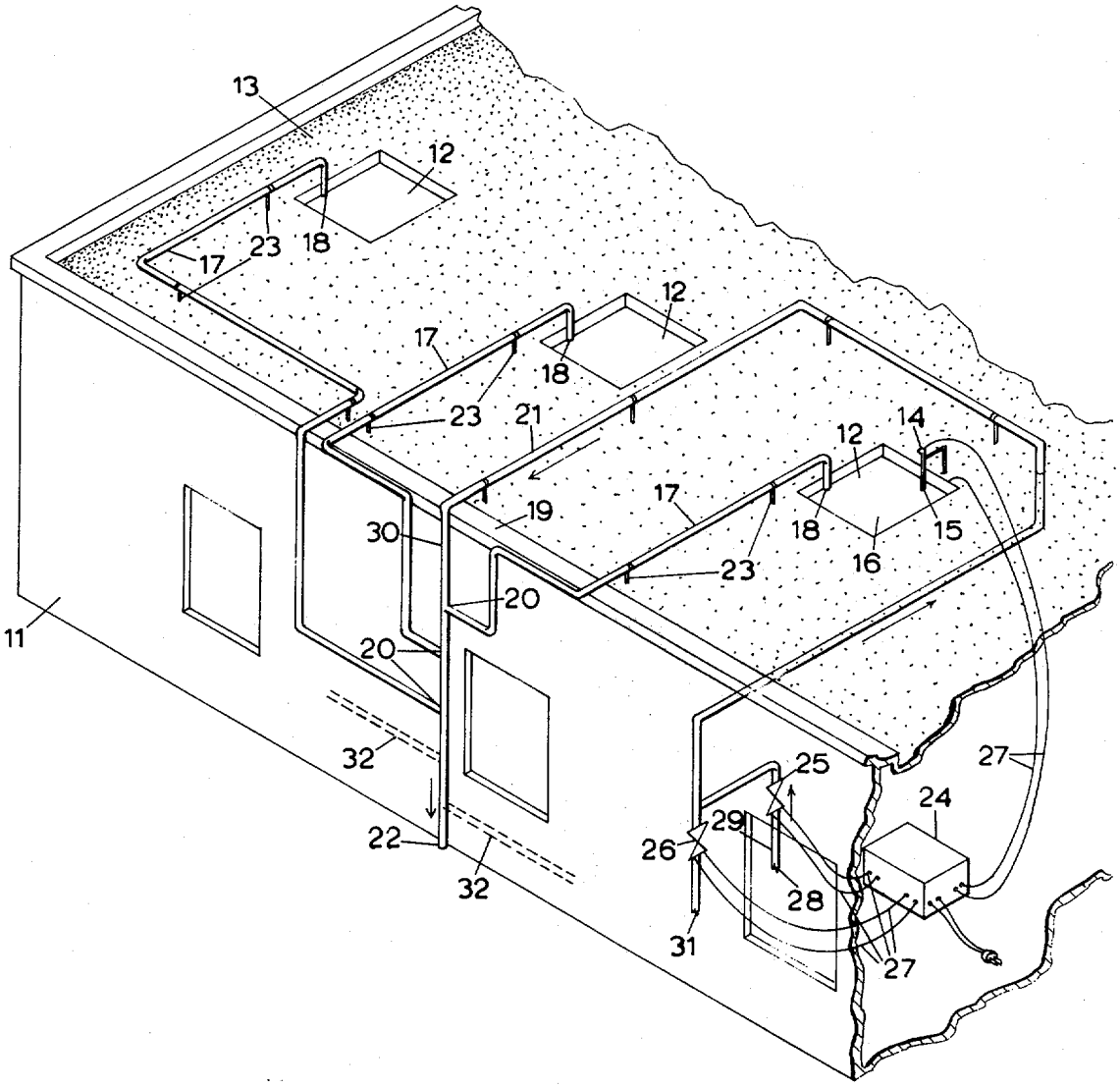
INVENTOR.
ROBERT L. KUNDERT

ROOF DRAINING SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a system for automatically draining away water that accumulates on substantially flat roofs and other roofs that do not naturally drain completely.

2. Description of the Prior Art

Drains of various designs have been invented in the past for draining away water from areas where it tends to accumulate. These drains often use the syphon principal to effectuate the draining and also sometimes employ a means to prime the syphon lines. For example, two such drains are shown in U.S. Pat. No. 2,313,855 by J. H. Wiggins and in U.S. Pat. No. 831,817 by George D. Ackley. However, both of these drains have valve means connected directly in the syphon pipe itself. These valves must be employed as shown in the above-mentioned patents in order for the proper suction in the syphon pipe to be created by the priming means and to prevent interference with the start of the syphoning action. Moreover, both of these drains utilize only one sump, which must be located at a point on the surface to be drained where all of the water tends to collect. It is apparent that if there is more than one low spot, then the water will tend to collect at more than one place and more sumps will be needed. However, to add more sumps to the drains shown in the above mentioned patents would also require that valves be connected and duplicated in each of the additional syphon lines required. The more valves there are in the syphon lines the more complicated the system gets and thus, the more chance there is for a malfunction to occur. A further problem with valves in the syphon lines is that residue and deposits that may be sucked into the syphon line from the surface to be drained are likely to collect at the valve and eventually cause the valves to malfunction either by plugging them closed or preventing them from completely closing.

SUMMARY OF THE INVENTION

Generally, my invention comprises a system for automatically draining away water that accumulates on flat surfaced areas and more particularly flat surfaced roofs. The system works automatically in that the draining process will be commenced automatically when a pre-set amount of water has accumulated in a control sump on the roof. My system works equally well whether it employs one sump and one syphon line or a multiple number of sumps and syphon pipes. Moreover, my system does not employ any moving parts, such as valves, in any of the syphon lines themselves so that there are not any points in the syphon lines where residue will tend to collect and plug the syphon lines.

These objects are accomplished by my drain system which has a plurality of sumps which are positioned at the various places on a flat roof where water tends to collect. Each sump has a syphon pipe extending from it and over the edge of the roof and thereafter connected to a common discharge pipe. This discharge pipe is also the priming pipe for the entire system. Extending into one of the sumps, which is the control sump, is a water sensitive probe. This control sump is located in the area where the maximum amount of water tends to collect. When water has collected in this sump to a level such that the probe is in contact with the water, an electronic control closes the electric circuit to a solenoid valve that connects the priming discharge pipe to a pressurized water supply. When the electric circuit to the solenoid valve is closed, the valve opens and permits water to flow through the priming-discharge pipe past the points at which the syphon pipes connect to it and out the discharge end of the priming-discharge pipe. The flow of water past the points at which the syphon pipes connect to the priming-discharge pipe causes an aspirating action at these connecting points. This aspirating action at the connecting points of the syphon pipes will cause any water that has collected in the sumps at the other end of the syphon pipes to be sucked into the pipes with a consequent syphoning of any liquid that has accumulated in the sump and on the surrounding roof area.

Other objects, features and advantages to my invention will be apparent from the following detailed description taken in conjunction with the accompanying drawings.

BRIEF DESCRIPTION OF THE DRAWINGS

FIG. 1 is a perspective view showing the preferred embodiment of my invention.

DESCRIPTION OF THE PREFERRED EMBODIMENT

Referring now more particularly to the drawing, my roof drain system is shown in a typical three sump setup. A building 11 is shown with sumps shown generally as 12 located in roof 13. The sumps are located in those areas of the roof where water tends to collect. A probe 14 is shown in place in one of the sumps. The lower end 15 of the probe is elevated slightly above the bottom 16 of the sump. The purpose of this probe will become more readily apparent later in this description. The sump in which the probe is located becomes the control sump and is preferrably that sump which is located at the place on the roof where the greatest volume of water tends to collect. This place may or may not coincide with the lowest point on the roof.

Syphon pipes 17 are shown with their intake ends 18 extending into sumps 12. The syphon pipes 17 extend over the edge 19 of the roof 13 and connect to leg 30 of a common priming-discharge pipe 21 which extends substantially down to the ground level to a point where the liquid that is syphoned from the roof is discharged to the atmosphere out the discharge end 22 of pipe 21. As shown in the drawing, the vertical extent of each siphon pipe from the point where it extends over the edge of said roof to their ends 20 is greater than the vertical extent of each of said pipes from their intake ends to the point where said pipes become substantially horizontal. There is a vertical drop in elevation from the points at which the syphon pipes extend over the edge of the roof to the points at which the ends 20 of the syphon pipes connected to leg 30 of the common discharge pipe 21. The syphon pipe leading from the control sump is the first pipe connected to leg 30 after this vertical drop in elevation, and there is a further drop in elevation before each of the other syphon pipes successively connect to the leg 30 of pipe 21. Thus there is a vertical separation, by intervals of the vertical leg 30 of the priming-discharge pipe 21, between each of the points at which each of the ends 20 of the syphon pipes 17 connect to pipe 21. This vertical separation by intervals of leg 30 allows the aspirating action of each of the syphon pipes 17 to be maintained even though one or more of the sumps 12 might not have sufficient water in them to cover the end 18 of its respective syphon pipe. Further, there is an interval of the vertical leg 30 of the priming-discharge pipe 21 from the point at which the last syphon pipe connects to the pipe to the discharge end 22 of pipe 21.

The pipes 17 are supported above the roof by support means 23 and the supports are structured such that the pipes are elevated by at least the amount of one pipe diameter higher at the portion of the syphon pipes immediately adjacent to the sumps than the elevation of the pipe at any other point along its run to the edge of the roof and down to its point of connection to the discharge pipe. The reason for this slight elevation is to prevent any backflow of water into the sumps, especially the control sumps, whereby such a backflow of water might cause the electrical probe 14 to recycle the system when there is not any collection of water on the roof except for the small amount of water that has backflowed into the sump. Further this slight elevation allows a natural drainage of any water that may otherwise be left standing in the portion of the syphon pipe 17 that runs along the roof plane.

Control means to automatically actuate my roof draining system comprises the probe 14, the control box 24 and solenoid valves 25 and 26 along with the related electrical wires 27. The control box 24 is a conventional well-known control box with conventional relays and switches for opening and closing the circuits to solenoid valves 25 and 26. There is also a timer (not shown) in the control box 24. The operating cycle of this control box is actuated when it senses the conducting current between the probe 14 and the metallic sump pan when water is in contact with both at the same time. Valves 25 and 26 are normally in the closed and open position respectively. When rain water, or for that matter any liquid having at least the conductivity of rain water, begins to fill the control sump with the electrical probe extending into it, electronic means in the control box 24 sense the presence of water in the sump when it has risen to the point where contact is made with the bottom 15 of the probe 14. The relays and switches in the control box 24 are then actuated automatically when this signal is received from the probe 14 and the valve 25 is opened and the valve 26 is closed. The intake end 28 of pipe 29 connects the solenoid valve 25 to a pressurized water supply (not shown) and when valve 25 has been opened and valve 26 closed water will flow through the valve 25 and the priming-discharge pipe 21 in the direction shown by the arrows. As water fills the priming-discharge pipe and flows past the points at which the ends 20 of syphon pipes 17 connect to pipe 21 a decrease in pressure is created at the discharge ends 20 of pipe 17 as compared to the normal atmospheric pressure at the ends 18 of pipe 17. This decrease in pressure will cause an aspiration of the liquid that has accumulated in the sumps 12 and the liquid will commence to flow through the syphon 17 from the intake ends 18 to the discharge ends 20 and thence through the priming-discharge pipe 21 and out the discharge end 22 of the latter. Once the liquid has filled any of the syphon pipes 17 the syphoning action will have begun and will continue so long as there is liquid in any of the sumps at a level above the ends 18. Once the syphoning action has begun in the pipe 17 it will continue until all of the water has been drained from the sump and the surrounding roof area to a point where the level of the water in any sump is below the end 18 of any of the syphon pipes. If the syphoning action is discontinued in any one of the pipes 17 because the sump has been emptied, the syphoning action will continue in the remaining sumps until each one of them has been drained to the point where the water level is below the end 18 of the syphon pipe 17.

It has been noted that the points at which the ends 20 of the syphon pipes 17 connect to the priming-discharge pipe 21 are vertically separated from each other by intervals of the vertical leg 30 of pipe 21. It is possible to join all of the syphon lines at one common connecting point to pipe 21, but it has been found that when more than one sump and syphon pipe are used, the aspirating action of the syphon pipes might be lost under certain conditions if all of the syphon points connect to the pipe 21 at one point. Such a condition might occur if the control sump has a sufficient amount of water collected in it such that the water contacts the electrical probe so that the drainage cycle is commenced, but there is not a sufficient amount of water collected in one or more of the other sumps to cover the intake ends 18 of syphon pipes 17. Such a condition might occur when there is only a light drizzle so that the sump pans are filing very slowly. When the priming commences because the system has been actuated by the water contact with the electrical probe, as the priming water flows through the pipe 21 past the point where the syphon pipes connects to it aspiration of the water that is collected from the sumps should occur. However, if the intake ends 18 of any of the syphon pipes 17 are not covered with water, the intake is exposed to the atmosphere and no aspiration will occur at that sump. Further because of this lack of aspiration at one or more of the other sumps, there does not occur the usual decrease in pressure at the points where the syphon pipe connects to the discharge pipe and a loss of the aspiration action at all of the sumps might be caused thereby. This problem is eliminated by having a sufficient interval of the vertical leg 30 of the priming-discharge pipe 21 between each the points at which each of the syphon pipes connect to the pipe 21.

Solenoid valve 25 closes after the priming-discharge line 21 has been filled with water and the syphoning action has commenced in the syphon pipes 17. The relays and switches in control box 24 that close valve 25 are actuated by the timer which is set after the system has been installed in a roof and it has been determined how long it is necessary for the priming water to be supplied in order to start the proper syphoning action in all of the syphon pipes. After solenoid valve 25 closes solenoid valve 26 remains closed until the roof has been drained. Solenoid valve 26 is again opened automatically when all of the water from the control sump has been syphoned off such that the water lowers to a level that it breaks contact with the end 15 of the electrical probe 14. The opening of the valve 26 allows any water that may remain in the priming-discharge line 26 to drain from the end 31. This will eliminate any chance of free standing water remaining in the pipe to freeze or otherwise cause problems. It is for this reason that the electrical probe 14 is located in that sump where the most volume of water will tend to collect so that the solenoid valve 26 will remain closed until the water has drained from that sump. When the control sump has been fully drained all of the other sumps will also have been fully drained.

Dotted lines 32 show how additional syphon pipes would be connected to the priming-discharge line 21. This again shows that there is a drop in elevation between each point where a syphon pipe is connected to the priming-discharge line.

It is understood that the sensing and control means described are not limited to electro-mechanical means but the same functions could also be achieved by mechanical, hydraulic, pneumatic, and fluidic control means.

It is understood that my invention is not confined to the particular construction and arrangement of parts herein illustrated and described, but embraces all such modified forms thereof as may come within the scope of the following claims.

I claim:

1. In combination with a substantially horizontal roof, a roof draining system for draining away water that accumulates on the roof, said roof draining system comprising, a. at least two sumps installed on said roof, including one of which is a control sump, b. at least two siphon pipes, each pipe having an intake end and a discharge end, the intake end of one of said pipes extending into said control sump substantially to the bottom thereof and the intake end of each of the other siphon pipes extending into one each of the other said sumps substantially to the bottoms thereof, each of said siphon pipes extending therefrom over the edge of said roof and downwardly to their respective discharge ends, c. a priming-discharge pipe for initiating the siphoning action of said siphon pipes, said priming-discharge pipe having an inlet end and a discharge end, said priming-discharge pipe extending from said inlet end across said roof and over the edge of said roof downwardly to its discharge end, the discharge end of the siphon pipe associated with said control sump being connected to the downwardly extending portion of said priming-discharge pipe between said roof edge and the discharge end of said priming-discharge pipe, and the discharge end of each of said other siphon pipes being connected to the downwardly extending portion of said priming-discharge pipe at vertically spaced intervals between the connecting point of said first connected siphon pipe and the discharge end of said priming-discharge pipe, d. means for introducing water into the inlet end of said priming-discharge pipe connected to said means, e. a water detecting probe extending into the control sump in spaced relation with the bottom of said control sump, and f. control means operatively connected to said probe, said control means connected to and actuating said means for introducing water to said priming-discharge pipe when said probe detects water in said control sump.

2. The roof draining system as specified in claim 1 having timing means for terminating the introduction of water into the inlet end of said priming-discharge pipe.

3. The roof draining system as specified in claim 1 wherein, the siphon pipe associated with said control sump slopes downwardly from a point above said sump toward the edge of said substantially horizontal roof to prevent backflow of water into said control sump.

*4. In combination with a roof structure having a plurality of liquid accumulating areas defining sump means, a roof draining system comprising a plurality of interconnecting pipe means coupled individually at least one each to said sump means; a generally vertically located discharge pipe means mounted adjacent to said roof structure, a plurality of interconnecting pipe means connected to said sump means and to said discharge pipe means and being connected to said discharge pipe means in vertically staggered relation to each other to maintain siphon action independently of each other, and initiating means to introduce liquid into said discharge pipe means for initiating a downward flow of liquid through said pipe means from the uppermost of said connecting pipe means to thereby initiate a siphon action for withdrawing water from said several sump means.*

*5. The apparatus of claim 4 wherein one of said sump means constitutes a control sump means having detection means for detecting the level of the liquid therein; and said initiating means having automatic operating means coupled to said detection means and introducing of liquid into said discharge pipe means for creating said downward flow.*

*6. The combination of claim 4 wherein said initiating means includes a timing means for terminating activation of said initiating means after predetermined initiation of said downward flow.*

*7. The combination of claim 4 wherein said connecting pipe means from said control sump means constitutes the vertically uppermost pipe connection to said vertically located discharge pipe means.*

*8. The combination of claim 4 wherein said vertical pipe means is located immediately adjacent to the outer wall of said building and said interconnecting pipe means include vertical extending terminal portions extended downwardly into aligned vertically spaced relation to said discharge pipe means.*

* * * * *